United States Patent
Tyshko et al.

(10) Patent No.: US 10,865,717 B2
(45) Date of Patent: Dec. 15, 2020

(54) DUAL MODE INTERNAL COMBUSTION ENGINE

(71) Applicants: Alexey Tyshko, Coatesville, PA (US); Nataliya Kulichenko, Vienna, VA (US)

(72) Inventors: Alexey Tyshko, Coatesville, PA (US); Nataliya Kulichenko, Vienna, VA (US)

(*) Notice: Subject to any disclaimer, the term of this patent is extended or adjusted under 35 U.S.C. 154(b) by 0 days.

(21) Appl. No.: 16/432,859

(22) Filed: Jun. 5, 2019

(65) Prior Publication Data

US 2019/0301371 A1 Oct. 3, 2019

Related U.S. Application Data

(60) Provisional application No. 62/681,004, filed on Jun. 5, 2018.

(51) Int. Cl.
| | | |
|---|---|---|
| *F02B 75/12* | (2006.01) | |
| *F02D 13/02* | (2006.01) | |
| *F02D 13/06* | (2006.01) | |
| *F02D 17/02* | (2006.01) | |

(52) U.S. Cl.
CPC ......... *F02D 13/0276* (2013.01); *F02D 13/06* (2013.01); *F02D 17/026* (2013.01)

(58) Field of Classification Search
CPC .... F02D 41/0087; F02B 75/282; F02B 75/12; F02B 2075/1812; F02B 2720/236
See application file for complete search history.

(56) References Cited

U.S. PATENT DOCUMENTS

| | | | |
|---|---|---|---|
| 1,601,548 A | 9/1926 | Zier et al. | |
| 4,917,054 A | 4/1990 | Schmitz | |
| 5,072,589 A * | 12/1991 | Schmitz | F02B 41/08 |
| | | | 123/560 |
| 5,189,993 A * | 3/1993 | Schneider | F02B 41/00 |
| | | | 123/192.2 |
| 5,265,564 A | 11/1993 | Dullaway | |
| 6,318,310 B1 * | 11/2001 | Clarke | F02B 33/22 |
| | | | 123/70 R |
| 6,776,144 B1 | 8/2004 | Newman | |
| 2002/0050253 A1 * | 5/2002 | Schmitz | F02B 41/06 |
| | | | 123/64 |
| 2009/0223482 A1 * | 9/2009 | Schmitz | F01L 1/36 |
| | | | 123/311 |
| 2009/0223483 A1 * | 9/2009 | Furr | F02B 75/32 |
| | | | 123/311 |

(Continued)

*Primary Examiner* — Long T Tran
(74) *Attorney, Agent, or Firm* — MU P.C.

(57) ABSTRACT

A reciprocating, internal combustion engine is capable of two modes of operation. The engine comprises three cylinders of substantially equal diameter. Each cylinder is provided with a piston. During operation, all pistons are synchronized and move in phase with one another. Valves are configured to selectively close paths between the second cylinder and two combustion chambers. Further valves are provided to selectively seal intake and exhaust channels leading to the two combustion chambers. A high efficiency combustion mode is achieved by increasing an expansion ratio through intake and compression of the fuel mixture in one cylinder and expansion in two cylinders. A high power combustion mode is achieved by compression and intake of the fuel mixture in two cylinders and expansion in one cylinder.

13 Claims, 9 Drawing Sheets

(56) References Cited

U.S. PATENT DOCUMENTS

| | | | | |
|---|---|---|---|---|
| 2009/0277403 A1* | 11/2009 | Hu | ............... | F02B 41/06 123/64 |
| 2011/0265760 A1* | 11/2011 | Park | ............... | F02B 75/225 123/403 |
| 2013/0199492 A1* | 8/2013 | Gopalakrishnan | ...... | F02B 33/22 123/254 |
| 2014/0261325 A1* | 9/2014 | Scuderi | ............... | F02B 41/06 123/445 |
| 2014/0318491 A1* | 10/2014 | Gebeau | ............... | F02B 33/22 123/193.3 |

* cited by examiner

DUAL MODE INTERNAL COMBUSTION ENGINE

CROSS-REFERENCE TO RELATED APPLICATION(S)

The present application claims priority to U.S. Provisional Patent Application No. 62/681,004 filed on Jun. 5, 2018, entitled "Dual Mode Internal Combustion Engine" the entire disclosure of which is incorporated by reference herein.

BACKGROUND OF THE INVENTION

The present invention relates to the multi-cylinder reciprocating internal combustion engines (gasoline or diesel) operating 4 stroke cycle.

Internal combustion engines have minimum response time to adjust the output power to the needed level which is important for the ground transportation. The ability to operate in the wide range of the output power with high efficiency for normal operation and provide high power spikes during the vehicle acceleration are main goals in the engine design. Currently the most efficient piston engines utilize 4 stroke cycle and use multiple cylinders for higher power and smooth operation.

Output power of the internal combustion engine is proportional to the amount of burned fuel and total engine efficiency.

One of the most important parameters affecting engine efficiency is the expansion ratio and efficiency increases with the increase of this ratio. To increase volumetric power the input gasoline/air mix or air must be compressed (see U.S. Pat. No. 1,601,548). The compression consumes energy from the engine output, resulting in decreased fuel efficiency. For a high efficiency operation mode, output power requirements are low, but the main requirement is increased miles per gallon (mpg) or low fuel consumption per horsepower. Operation of the engine in high efficiency mode is depicted in FIGS. 2-5.

For a second mode of operation, maximum peak power must be available when needed. For example, fast acceleration is required to merge onto highways, and pass slower vehicles. A second, high power mode of the engine operation allows for an increase in output power for short periods at the cost of a reduced mpg rate compared to the first, high-efficiency mode. Operation of the engine in high power mode is explained in FIG. 6-FIG. 9.

DESCRIPTION OF RELATED ART

The prior art includes using of a separate compressor cylinder to increase total amount of compressed air/fuel mixture in the firing cylinder U.S. Pat. No. 1,601,548 for increased output power or using additional expanding cylinders/pistons operating additional cycle for extracting more power from the burned gases U.S. Pat. No. 6,533,977 or similar to double and triple expansion steam engines using higher diameter cylinders U.S. Pat. Nos. 4,917,054, 5,072,589, 6,318,310, 6,776,144, 5,265,564.

Based on the foregoing, there is a need in the art combining above mentioned principles in one engine with the identical standard cylinders but with the ability to operate in the high efficiency mode or high power mode depending on the fast changing power requirements due to the traffic conditions by using additional cylinders either for compression of the air/fuel mix or for expansion or burned gases.

SUMMARY OF THE INVENTION

In an embodiment, a reciprocating, internal combustion engine is capable of dual mode operation. The engine is provided with three cylinders and three piston, one piston disposed in each cylinder. The pistons are synchronized, such that they move in phase with one another during operation in either mode.

In an embodiment, the first cylinder is connected to a first combustion chamber. A connecting valve can open or seal a path between the first combustion chamber and second cylinder. A third cylinder is connected to a second combustion chamber, and a second connecting valve can open or seal a path between the second combustion chamber and the second cylinder.

In an embodiment, a high efficiency mode of operation is accomplished by intaking a fuel mixture into a single cylinder and combustion chamber. At the end of the compression stroke, the connecting valve to the second cylinder opens, ignition starts, and the combusting gas is expanded into the second cylinder volume as well to increase the expansion ratio almost doubling it.

In an embodiment, a high power mode of operation is accomplished by intaking a fuel mixture into a two cylinders and a combustion chamber, doubling the compression ratio. At the end of a compression stroke the connecting valve closes and ignition starts that the combusting gas is expanded into a single cylinder.

The foregoing, and other features and advantages of the invention, will be apparent from the following, more particular description of the embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Preferred embodiments of the present invention and their advantages may be understood by referring to FIGS. 1-9, wherein like reference numerals refer to like elements.

Figure 1:
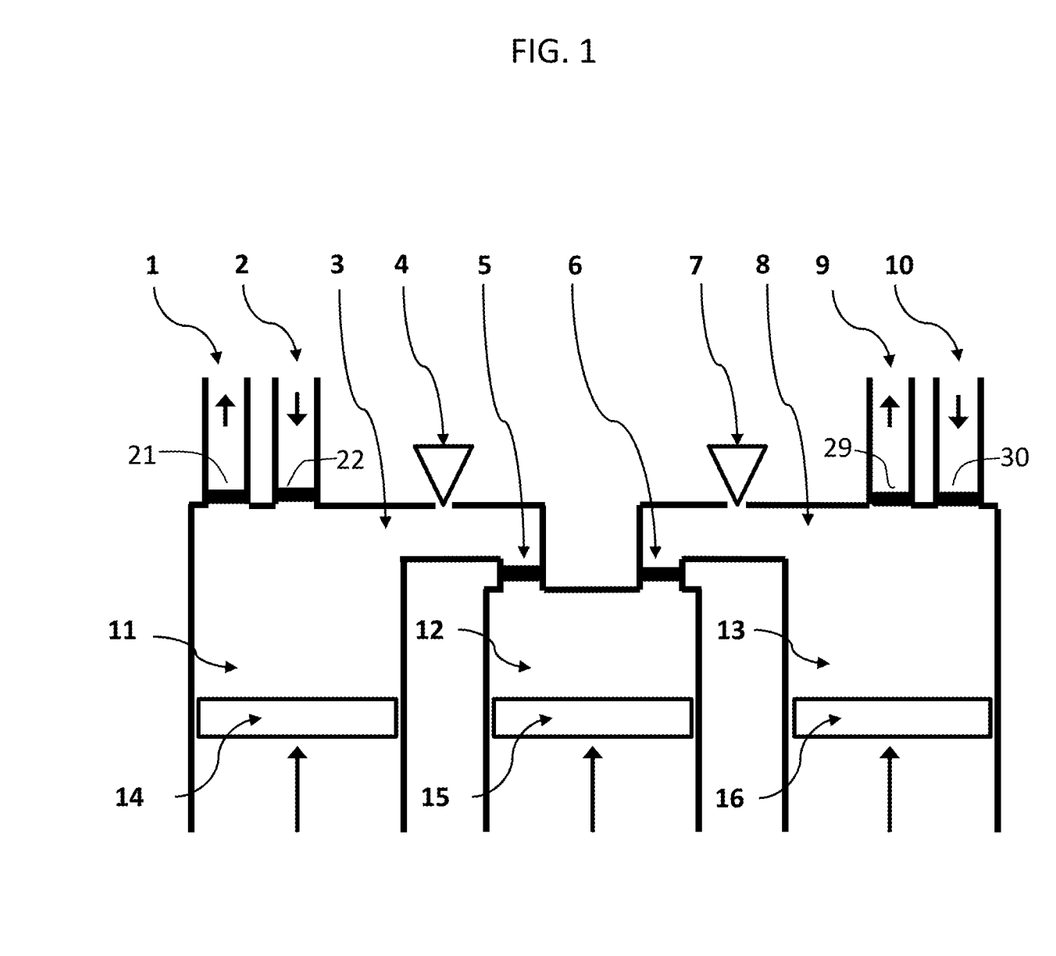
FIG. 1 is a schematic of the dual mode internal combustion engine, according to an embodiment of the present invention in the minimal configuration.

With reference to FIG. 1, the dual mode internal combustion engine is shown according to an embodiment of the present invention. In the embodiment, the engine is provided with a first cylinder 11 containing first piston 14, a second cylinder 12 containing a second piston 15, and a third cylinder 13 containing a third piston 16. A first combustion chamber 3 is provided above the first cylinder 11, and a second combustion chamber 8 is provided above the third cylinder 13.

The engine is further provided with a first exhaust channel 1 and first intake channel 2 in fluid communication with the first cylinder 11 and first combustion chamber 3. A second exhaust channel 9 and second intake channel 10 are provided in fluid communication with the third cylinder 13 and the second combustion chamber 8. A first connecting valve 5 is provided to open or seal the fluid path between the first combustion chamber 3 and the second cylinder 12. A second connecting valve 6 is provided to open or seal the fluid path between the second combustion chamber 8 and the second cylinder 12.

In an embodiment, a first ignitor 4 is in communication with the first combustion chamber 3, and a second ignitor 7 is in communication with the second combustion chamber 8.

In an embodiment, wherein the fuel is gasoline, or other fuel source ignited by spark ignition, the intake channels 2, 10 provide a gas and air mixture into the combustion chambers 3, 8 and the ignitors 4, 7 are spark plugs, or another similar, capable of starting the combustion.

In an embodiment, wherein the fuel is ignited by compression ignition, such as diesel, the intake channels 2, 10 provide air into the combustion chambers 3, 8 and the ignitors 4, 7 are fuel injectors.

With reference to FIGS. 2-5, the dual mode engine is shown operating in a high efficiency mode. During the four strokes of the high efficiency mode, fuel/air mix fills cylinder 11 and cylinder 13 once, totaling two cylinder volumes. This mix is compressed with a ratio equal, for example 8. The burned gases from one cylinder, for example 13, expand in two cylinders 13 and 12 FIG. 2 with an expansion ratio close to 16, thus providing more power from the same fuel and a higher thermodynamic efficiency compare to the standard 4 stroke engine. The burned gases from cylinder 11 expand in two cylinders 11 and 12 FIG. 4.

In the high efficiency mode, the second cylinder 12 is used for extra expansion of the hot gases from combustion chambers 3, 8 for cylinders 11 or 13. Thus, a higher expansion ratio is provided, resulting in higher thermodynamic efficiency and better fuel efficiency. Per two crankshaft revolutions, only two cylinder volumes of the fuel/air mix (or just air) are used, and resulting hot gases are expanded to four cylinder volumes.

Figure 2:
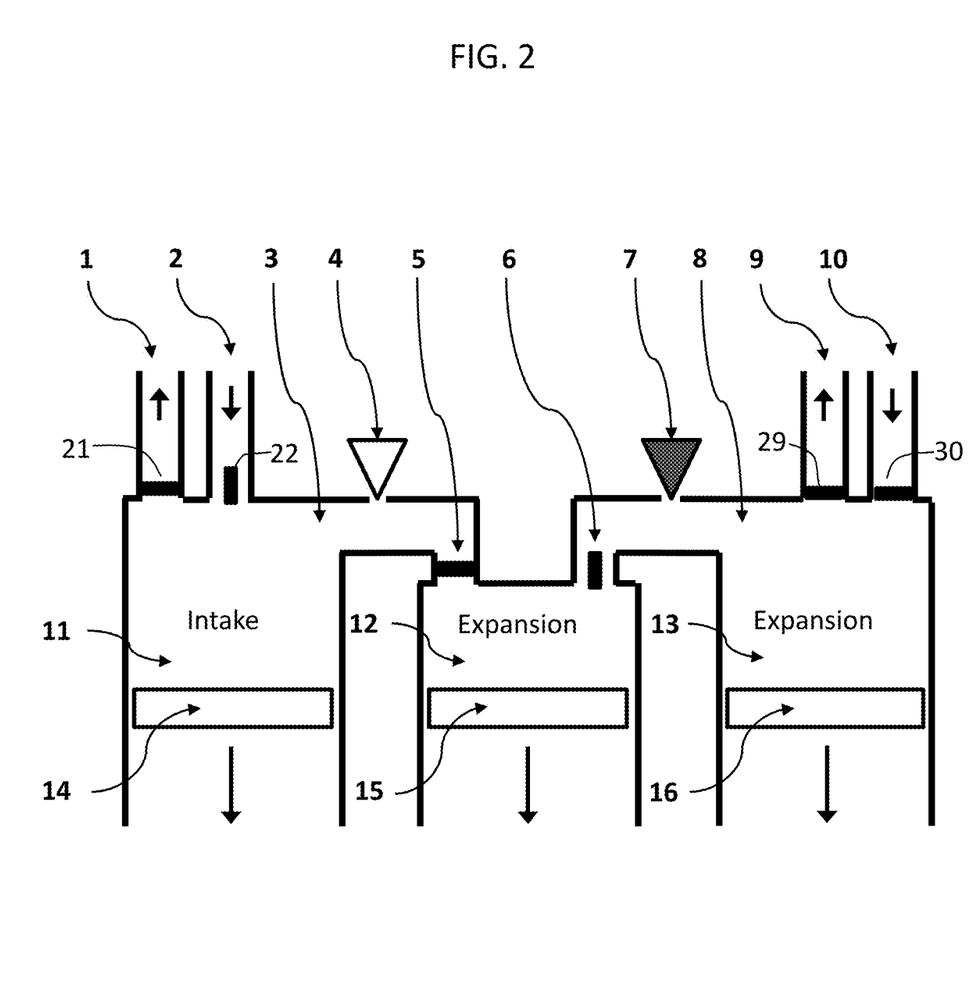
FIG. 2 is a schematic view of the dual mode internal combustion engine operating the first stroke in high efficiency mode, according to an embodiment of the present invention.

In an embodiment, with reference to FIG. 2, the engine is shown operating the first stroke in a high efficiency mode. During the first stroke, all three pistons 14, 15, 16 are moving down from an upper dead center position to the lower dead center position. The first intake valve 2 is open and the first cylinder 11 is filled with the air/fuel mix (air for diesel engine). The second connecting valve 6 is open, and the second ignitor 7 combusts the fuel in the second combustion chamber 8. The second cylinder 12 and third cylinder 13 are filled with expanding hot gases from second combustion chamber 8. At lower dead center, the first intake valve 2 closes and second exhaust valve 9 opens.

Figure 3:
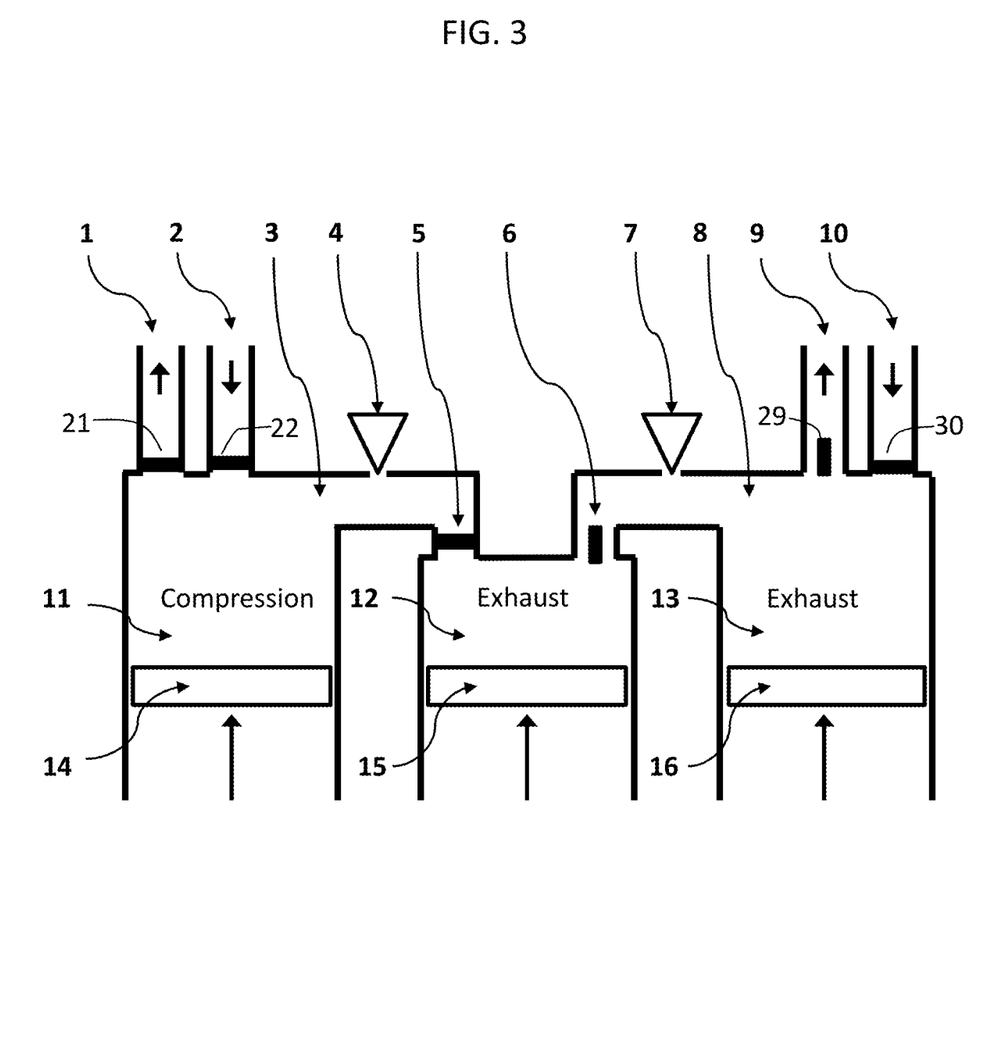
FIG. 3 is a schematic view of the dual mode internal combustion engine operating the second stroke in high efficiency mode, according to an embodiment of the present invention.

In an embodiment, with reference to FIG. 3, the engine is shown operating the second stroke in a high efficiency mode. During the second stroke all three pistons 14, 15, 16 move up. The first intake valve 2 is closed, and the second exhaust valve 9 is opened. The first piston 14 compresses the air/fuel mix in the first cylinder 11 and first combustion chamber 3, while two other pistons 15, 16 push exhaust burned gases from cylinders 12, 13 through the second exhaust channel 9. At the upper dead center, the second connecting valve 6 and the second exhaust valve 9 close. The first connecting valve 5 and second intake valve 10 open, connecting the first combustion chamber 3 with the small residual volume in cylinder 12. The ignitor 4 (spark plug or fuel injector) starts combustion process in the first combustion chamber 3.

Figure 4:
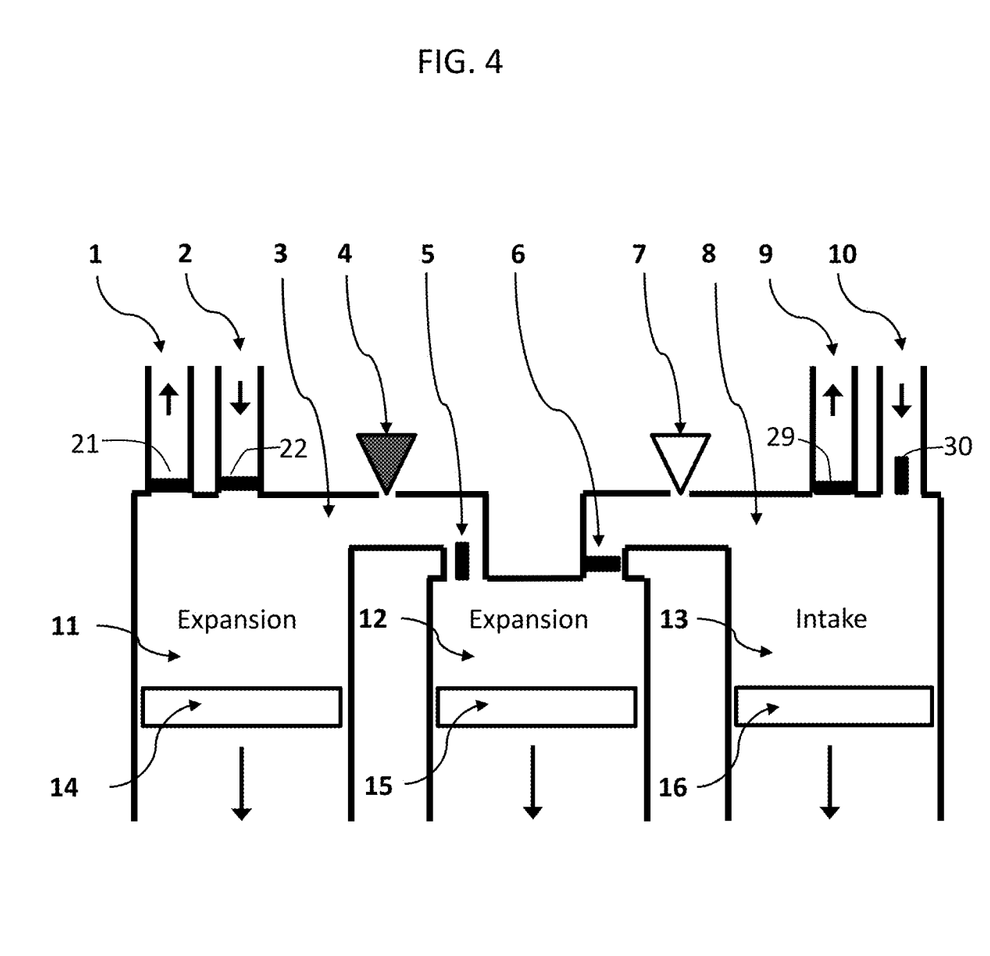
FIG. 4 is a schematic view of the dual mode internal combustion engine operating the third stroke in high efficiency mode, according to an embodiment of the present invention.

In an embodiment, with reference to FIG. 4, the engine is shown operating the third stroke in a high efficiency mode. During the third stroke, the first ignitor 4 starts combustion in the first combustion chamber 3. High pressure hot gases from first combustion chamber 3 expand into cylinders 11 and 12, pushing pistons 14 and 15 down to the lower dead center and producing useful work. The third cylinder 13 is taking fuel/air mix through the second intake channel 10. At lower dead center the first exhaust valve 1 opens releasing burned gases from cylinders 11, 12 while the second intake valve 10 closes.

Figure 5:
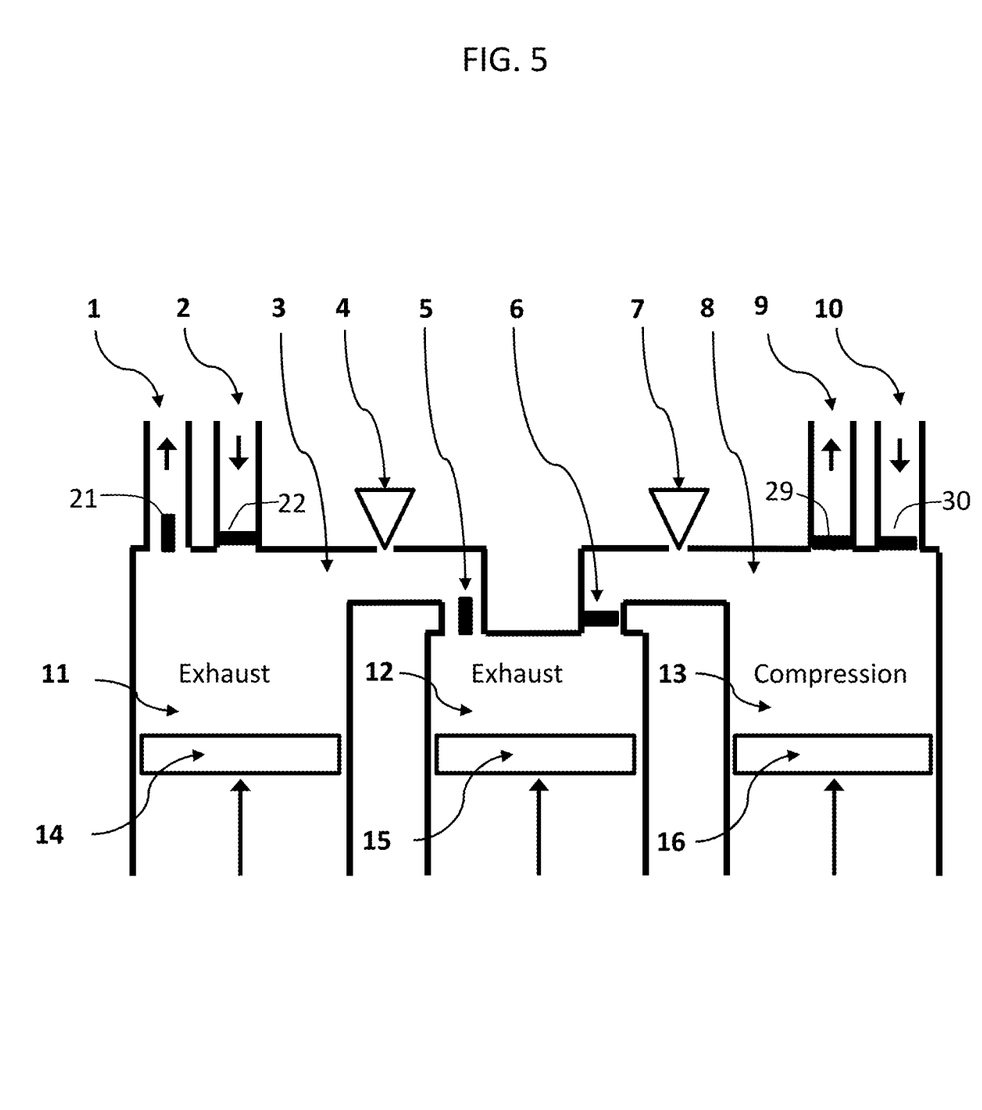
FIG. 5 is a schematic view of the dual mode internal combustion engine operating the fourth stroke in high efficiency mode, according to an embodiment of the present invention.

In an embodiment, with reference to FIG. 5, the engine is shown operating the fourth stroke in a high efficiency mode. During the fourth stroke, where exhaust gases from cylinders 11, 12 are pushed out via open valves 1, 5, the third piston 16 compresses fuel/air mix in the third cylinder 13. At the end of stroke 4, in the upper dead end, valves 1 and 5 close, valve 6 opens and second ignitor 7 initiates combustion in chamber 8 to start the first stoke. The cycle is then repeated.

With reference to FIGS. 6-9, the dual mode engine is shown operating in a high power mode. In the high power mode, the second cylinder 12 is used for additional compression of the fuel/air mix (or just air) in the combustion chambers (3 or 8) totaling in four volumes of the fuel/air mix or air spent per two crankshaft revolutions. However, the hot gases are expanded only into two volumes, decreasing thermodynamic efficiency. Twice the fuel consumption increases maximum pressure in the combustion chambers and resulting output power.

Figure 6:
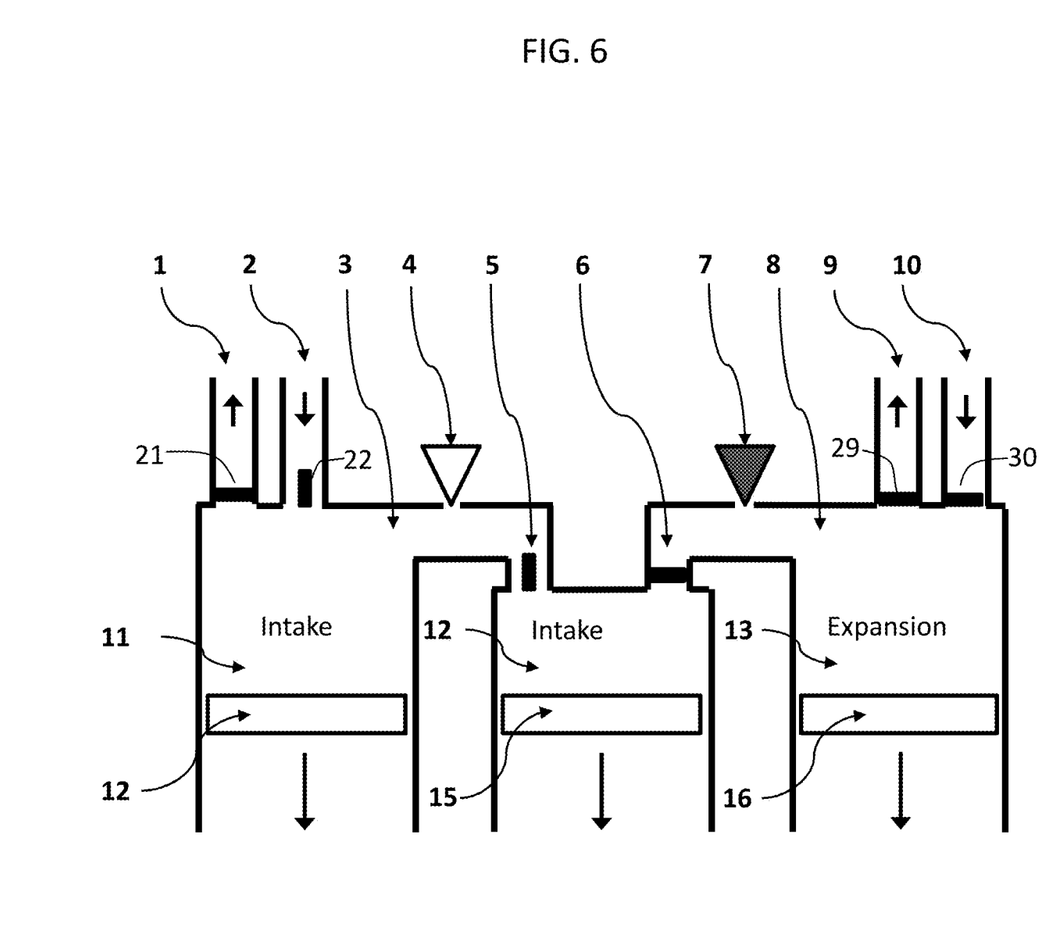
FIG. 6 is a schematic view of the dual mode internal combustion engine operating the first stroke in high power mode, according to an embodiment of the present invention.

In an embodiment, with reference to FIG. 6, the engine is shown operating the first stroke in a high power mode. During the first stroke, all three pistons 13, 14, 15 are moving down from an upper dead center position. The fuel/air mix entering cylinders 11 and 12 through the first intake channel 2 and open valve 5. The second ignitor 7 combusts the compressed fuel/air mix in the second combustion chamber 8, and cylinder 13 and piston 16 are in the expansion mode from the combustion. At the lower dead center valve 2 closes, ending intake into cylinders 11 and 12, while valve 9 opens starting exhaust from cylinder 13.

Figure 7:
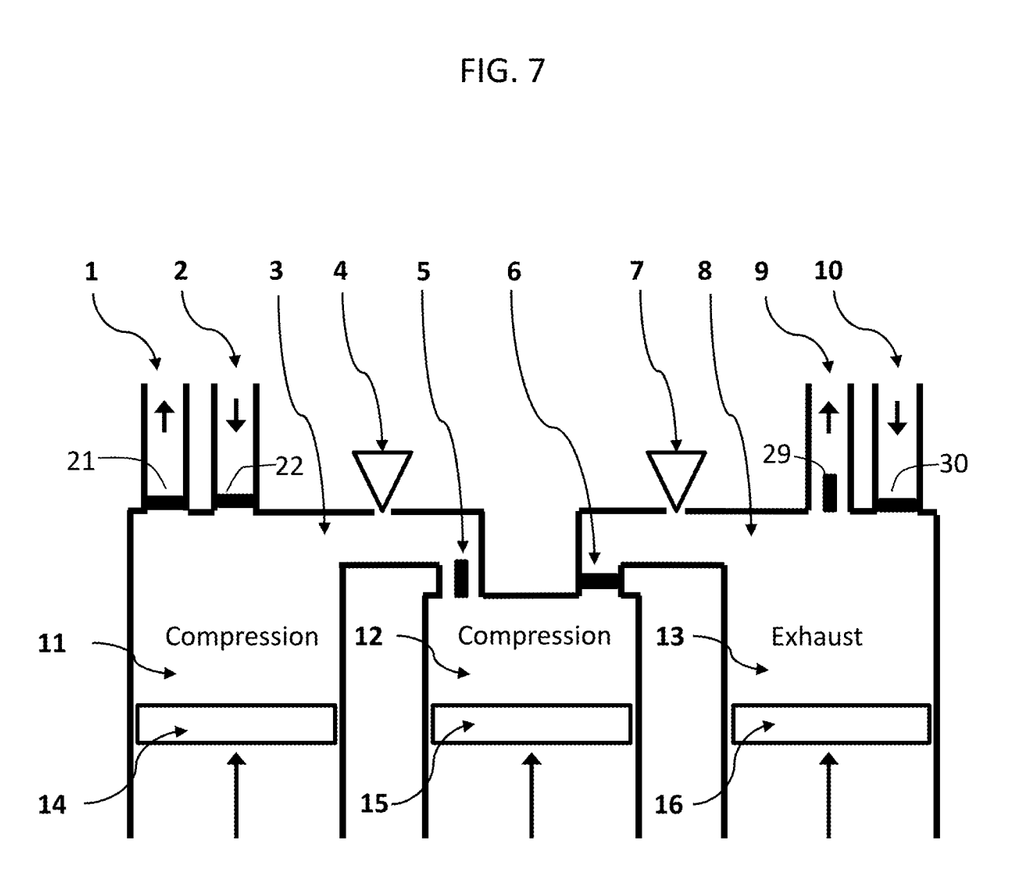
FIG. 7 is a schematic view of the dual mode internal combustion engine operating the second stroke in high power mode, according to an embodiment of the present invention.

In an embodiment, with reference to FIG. 7, the engine is shown operating the second stroke in a high power mode.

During the second stroke, the fuel/air mix in cylinders 11, 12 is compressed while the burnt gas is exhausted from cylinder 13 through the second exhaust channel 9. At the upper dead center, when compressed fuel/air mix from cylinders 11, 12 is pushed in the first combustion chamber 3, valve 5 closes and ignitor 4 starts combustion in first combustion chamber 3. Valve 6 opens, connecting the second cylinder 12 with second combustion chamber 8.

Figure 8:
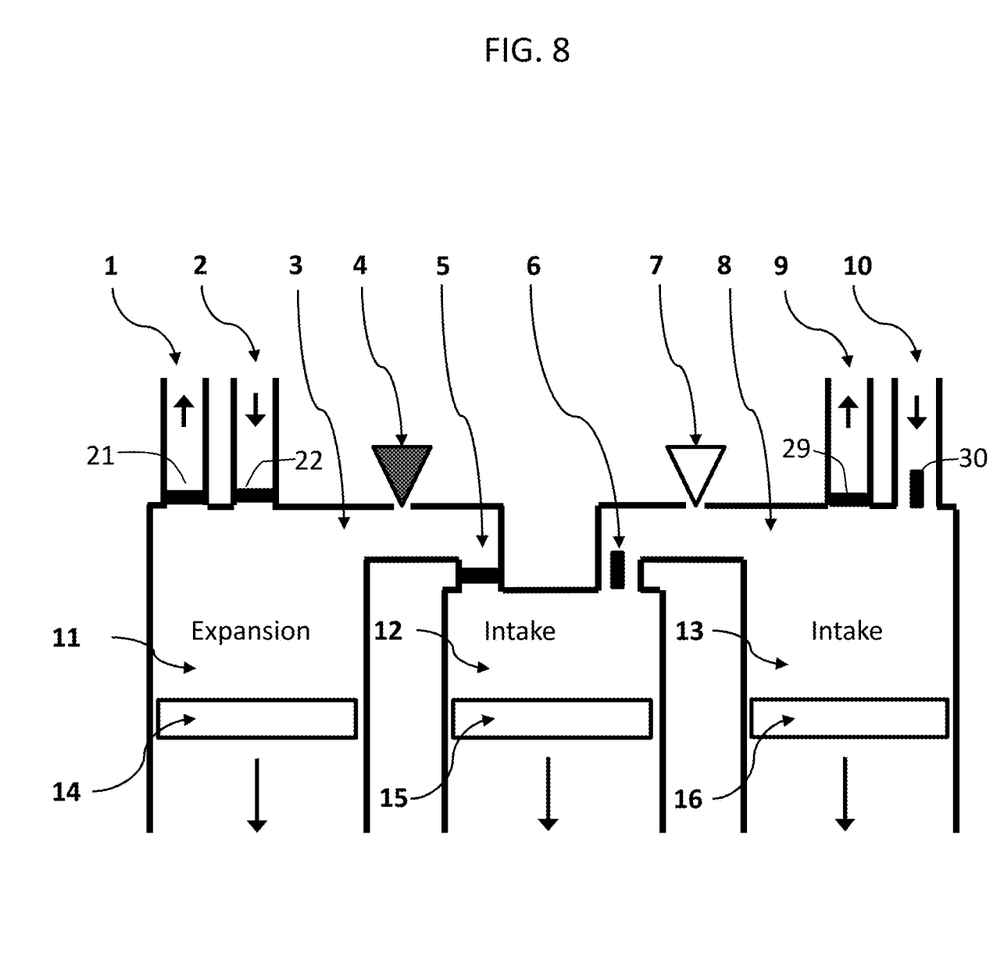
FIG. 8 is a schematic view of the dual mode internal combustion engine operating the third stroke in high power mode, according to an embodiment of the present invention.

In an embodiment, with reference to FIG. 8, the engine is shown operating the third stroke in a high power mode. During the third stroke, high pressure hot gases expand in cylinder 11 producing output power. Cylinders 12, 13 are filled with fuel/air mix from the second intake channel 10 and through open valves 6 and 10. At the lower dead center valve 1 opens allowing exhaust from cylinder 11 to exit through the first exhaust channel 1, and valve 10 closes ending intake.

Figure 9:
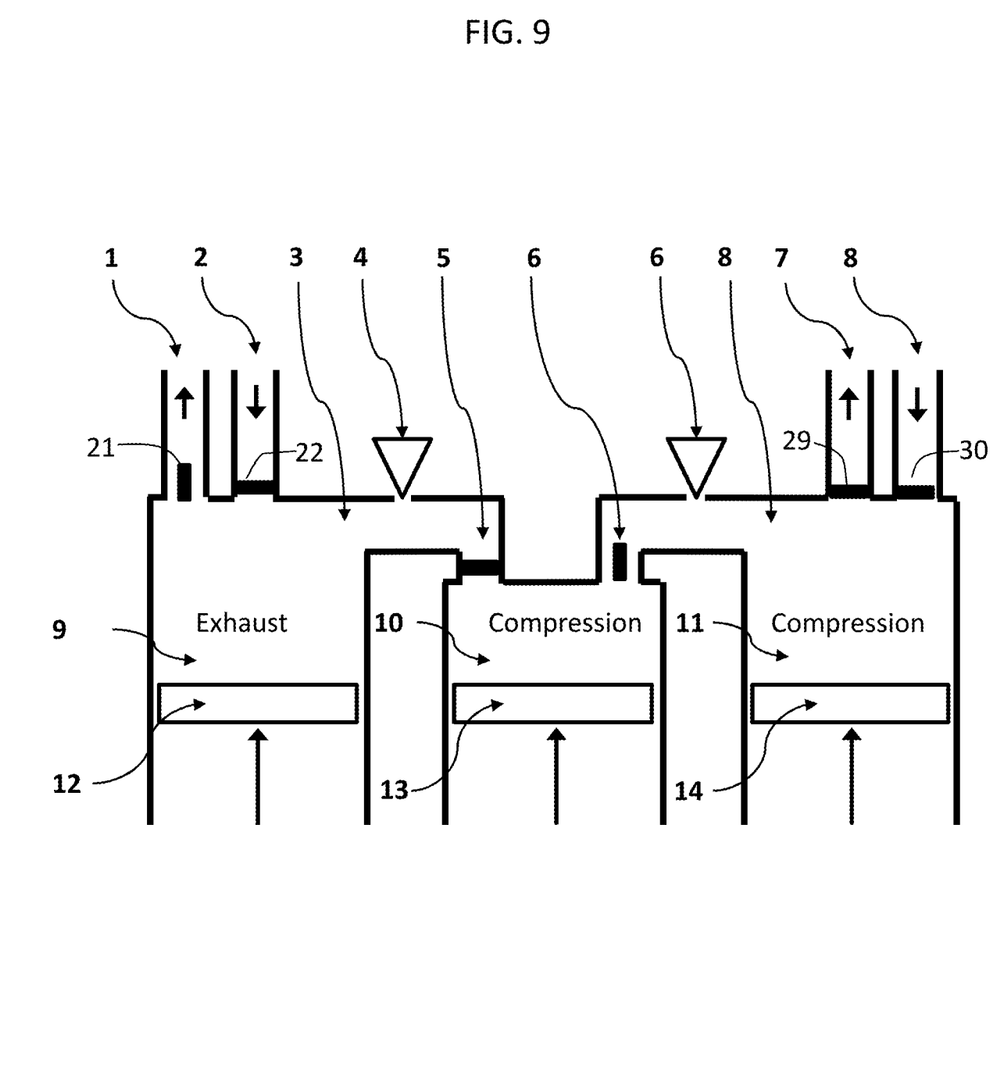
FIG. 9 is a schematic view of the dual mode internal combustion engine operating the fourth stroke in high power mode, according to an embodiment of the present invention.

In an embodiment, with reference to FIG. 9, the engine is shown operating the fourth stroke in a high power mode. During the fourth stroke, cylinder 11 is in exhaust mode and cylinders 12, 13 are in the compression mode. At the upper dead center, the second connecting valve 6 closes and ignitor 7 starts combustion in the second combustion chamber 8. Valve 1 closes and valves 2, 5 open for intake in cylinders 11, 12 and the first stroke begins as the cycle is repeated.

In the embodiments, the dual mode engine is described as a 3-cylinder engine. However, it would be obvious to combine multiple 3-cylinder configurations, resulting in a 6-cylinder, 9-cylinder, 12-cylinder, etc. configuration to increase the output power. In an embodiment, the cylinders of the dual mode engine may be configured in an in-line, V-configuration and opposite "boxer style".

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein.

We claim:

1. A reciprocating, dual mode, internal combustion engine comprising:
    three cylinders of substantially equal diameter;
    three pistons operating in phase within the three cylinders; and
    a plurality of valves configured to selectively close paths between the three cylinders, two combustion chambers, intake and exhaust channels,
    the internal combustion engine being configured to operate in a high efficiency combustion mode and a high power combustion mode, the high efficiency combustion mode being achieved by increasing an expansion ratio through intake and compression of the fuel mixture in a first cylinder of the three cylinders and expansion in a second and third cylinders of the three cylinders, the high power combustion mode being achieved by intake of the fuel mixture in two of the three cylinders, compression of the fuel mixture in the two of the three cylinders and expansion in a remaining cylinder of the three cylinders.

2. The engine of claim 1, wherein the cylinders are arranged in an in-line configuration.

3. The engine of claim 1, wherein the cylinders are arranged in a Vee configuration.

4. The engine of claim 1, wherein the fuel mixture is a gasoline mixture, and wherein each of the two combustion chambers are provided with an ignition source.

5. The engine of claim 4, wherein the ignition source is a spark plug.

6. An internal combustion engine comprising
    a first cylinder having a first piston concentrically disposed within;
    a first combustion chamber connected to the first cylinder;
    a first intake channel to provide a fuel mixture into the first combustion chamber, the first intake channel having a first intake valve;
    a first exhaust channel to exhaust combusted gases from the first combustion chamber, the first exhaust valve having a first exhaust valve;
    a first connecting valve configured to selectively seal a path between the first combustion chamber and a second cylinder, the second cylinder having a second piston concentrically disposed within;
    a second connecting valve configured to selectively seal a path between the second cylinder and a second combustion chamber;
    a third cylinder connected to the second combustion chamber, the third cylinder having a third piston concentrically disposed within;
    a second intake channel to provide a fuel mixture into the second combustion chamber, the second intake channel having a second intake valve; and
    a second exhaust channel to exhaust combusted gases from the second combustion chamber, the second exhaust valve having a second exhaust valve,
    wherein the first piston, the second piston, and third piston of operate in phase with one another, and wherein the internal combustion engine is configured to operate both in a high efficiency mode and a high power mode, the high power mode being achieved in connection with compressing two of the cylinders selected from the first, second and third cylinders.

7. The engine of claim 6, wherein the cylinders are arranged in an in-line configuration.

8. The engine of claim 6, wherein the cylinders are arranged in a Vee configuration.

9. The engine of claim 6, wherein the fuel mixture is a gasoline mixture, and wherein the first combustion chamber and the second combustion chamber are provided with an ignition source.

10. The engine of claim 9, wherein the ignition source is a spark plug.

11. A method of operating a four stroke, dual-mode, three cylinder engine comprising the steps of:
    selecting a high efficiency operation mode;
    closing a first connecting valve to seal a path between a second cylinder and a first combustion chamber, closing a first exhaust channel, opening a second connecting valve to create a path between a second cylinder and a second combustion chamber, igniting a fuel mixture in the second combustion chamber, expanding volume of each cylinder, and intaking the fuel mixture into the first cylinder and the first combustion chamber via a first intake channel during a first stroke of the high efficiency operation mode;
    closing the first intake channel, opening a second exhaust channel, compressing the volume of each cylinder, and exhausting combusted gas through a second exhaust channel during a second stroke of the high efficiency operation mode;
    closing the second exhaust channel, closing the second connecting valve, opening the first connecting valve, igniting the fuel mixture in the first combustion, expanding volume of each cylinder, and intaking the fuel mixture into the second cylinder and the second combustion chamber via a second intake channel, during a third stroke of the high efficiency operation mode;

closing the second intake channel, opening the first exhaust channel, compressing the volume of each cylinder, and exhausting the combusted gas through the first exhaust channel during a fourth stroke of the high efficiency operation mode;

selecting a high power operation mode;

opening the first intake channel, closing the first exhaust channel, closing, the second connecting valve, opening the first connecting valve, igniting the fuel mixture in the second combustion chamber, expanding the volume of each cylinder, and intaking the fuel mixture into the first cylinder, second cylinder, and first combustion chamber during a first stroke of the high power operation mode;

closing the first intake channel, opening the second exhaust channel, compressing the volume of the first and the second cylinders, and exhausting the combusted gas through the second exhaust channel during a second stroke of the high power operation mode;

closing the second exhaust channel, opening the second intake channel, closing the first connecting valve, opening the second connecting valve, igniting the fuel mixture in the first combustion chamber, expanding the volume of each cylinder, and intaking the fuel mixture into the second cylinder, third cylinder, and second combustion chamber during a third stroke of the high power operation mode; and closing the second intake channel, opening the first exhaust channel, compressing the volume of the second and third cylinders, and exhausting the combusted gas through the first exhaust channel during a fourth stroke of the high power operation mode, wherein compressing and expanding the volume of each cylinder is accomplished by in phase movement of three pistons, one piston concentrically disposed within each of the three cylinders.

12. The method of claim 11, wherein the fuel mixture is a diesel fuel mixture, and wherein the step of igniting the fuel mixture comprises spontaneously igniting the diesel fuel mixture via compression ignition.

13. The method of claim 11, wherein the fuel mixture is a gasoline fuel mixture, and wherein the step of igniting the fuel mixture comprises producing an electrical spark.

* * * * *